O. SÆLID & K. PETTERSEN.
ELECTRICALLY HEATED KITCHEN RANGE.
APPLICATION FILED NOV. 4, 1914.

1,154,270.

Patented Sept. 21, 1915.

Witnesses:
B. Dommers
E. Leckert.

Inventors
Oskar Sælid,
Kristian Pettersen.
By Hunworth atty

UNITED STATES PATENT OFFICE.

OSKAR SÆLID AND KRISTIAN PETTERSEN, OF SARPSBORG, NORWAY.

ELECTRICALLY-HEATED KITCHEN-RANGE.

1,154,270.  Specification of Letters Patent.  Patented Sept. 21, 1915.

Application filed November 4, 1914. Serial No. 870,225.

*To all whom it may concern:*

Be it known that we, OSKAR SÆLID and KRISTIAN PETTERSEN, subjects of the King of Norway, residing at Sarpsborg, Norway, have invented certain new and useful Improvements in Electrically-Heated Kitchen-Ranges; and we do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

Our invention relates to electrically heated kitchen-ranges with heat accumulating medium.

The main object of the invention is to provide a kitchen range of this kind, which will be adapted for cooking as well as for frying purposes with heat from top as well as from below.

The invention consists in the provision of means for regulating the heat to the several cooking vessels, whereby a range is provided that is well suited for the several varying household purposes.

Figure 1:
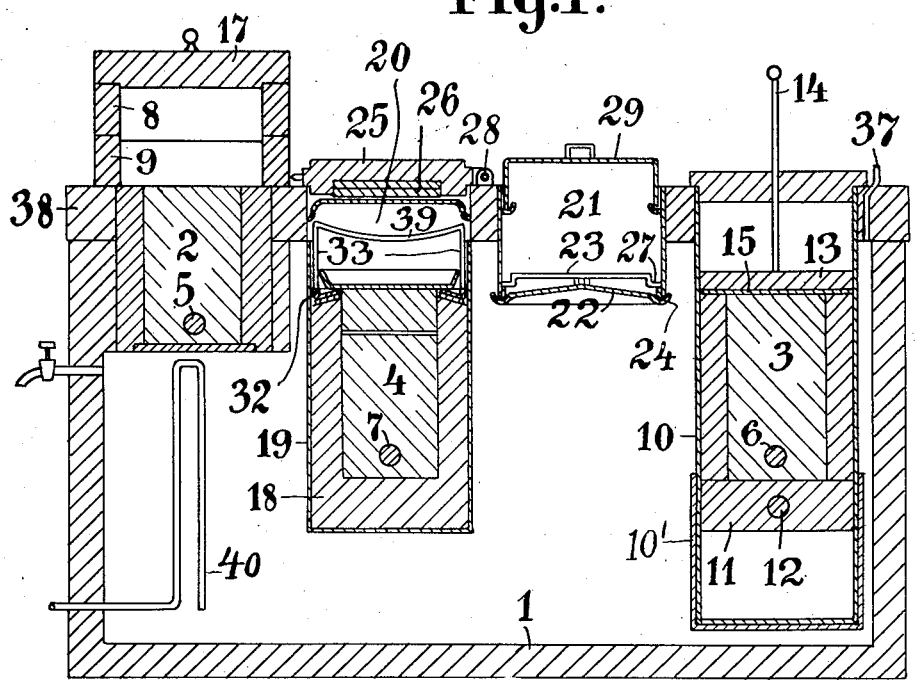
Figure 2:
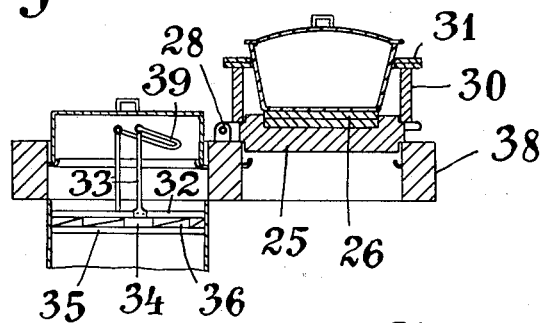
Figure 3:
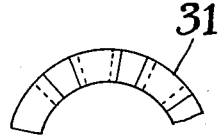

On the drawings, Figure 1 is a vertical sectional view through the range. Fig. 2 is a detail sectional view. Fig. 3 is a plan of an insulating belt for the cooking vessels.

The range consists of an insulated tank 1 filled with water and provided on the top with suitable openings or recesses for blocks 2, 3, 4, heated by electrical resistance elements 5, 6, 7 and supported in receptacles adapted to form cooking or frying chambers inside said tank. In the top plate of the range there is also provided openings for one or more vessels, which form heating chambers serving to complete the cooking of food the initial cooking or frying of which has taken place on the heating blocks. On the drawing there is shown three heating blocks and one heating chamber, but any convenient number of these parts may of course be provided.

The heating block 2 serves to heat one or more cooking vessels, placed on the top of same and also to heat the water in tank 1. The insulating hood on top of said block may consist as shown of several parts 8, 9 for cooking vessels of different size and a cover 17 for preventing loss of heat from the cooking vessel on the said block.

The heating block 3 is placed inside a watertight vessel 10, the bottom part of which is provided with an insulating covering 10', and the top of said vessel is fastened to the top plate 38 of the tank 1. Below the block 3 there is provided a special heating block 11 preferably provided with a heating element 12. Both blocks 3, 11 are slidably mounted inside said vessel 10, being held in place by friction so that their position may be adjusted according to circumstances. Thus the blocks may be placed at a certain distance from each other, the space between them then being suitable as a frying chamber by utilizing the heat stored in both blocks. On the top of block 3 is provided a thick iron plate 13 which may be moved independently by means of rod 14 so that another frying chamber may be provided on the top of block 3. For regulating the transmission of heat from block 3 to a cooking vessel thereon a cover 15 of asbestos or the like may be placed between them.

The blocks 3 and 4 may be removed from their chamber and be placed in a separate insulating vessel for cooking outside the range. The block 4 provided with the heating element 7 is mounted in a heat insulating hood 18 placed in a tight vessel 19, which projects downwardly into the water tank 1. Above the block 4 room is left for a cooking chamber 20. Beside this cooking chamber there is placed in tank 1 another vessel 21 forming a heating chamber for preheating and keeping hot the food. The vessel 21 is closed at the bottom by means of a floating plate 22 provided with a water-tight packing 24 and operating as an automatic valve to prevent escape of steam. By using the floating plate as shown on the drawing, one may take hot water up through the chamber 21 by pushing down the plate 22. The latter is made of a material lighter than water or it may be a hollow metal body which will operate the same as the well known form of float valve. The chamber 21 may also in a similar way be utilized for cleansing the tank. Above the plate 22 is placed a grate 23 having feet 27 resting on an inwardly projecting flange on the inside of the cylinder. The grate 23 serves to support a cooking vessel (not shown), which may be placed in heating chamber 21.

The insulating cover 25 for the chamber 20 is provided on its underside with a cooking plate 26, which may be heated electrically. The insulating cover 25 is connected by a hinge 28 to the top plate 38, so that it may be turned on its hinge to cover chamber 21 (Fig. 2) or the cooking chamber 20, as shown on Fig. 1. The hinge 28 may also be mounted to swing on a vertical trunnion, so that the cover 25 may be placed in any convenient position on the range. The insulating cover 25 and the cover 29 may be used alternatively.

The efficiency of the heating may be increased by means of an insulating ring 30 (Fig. 2) placed around the edge of the insulating cover. The efficiency may be further increased by means of a belt 31 (Figs. 2 and 3) consisting of sections connected to a ring, which is placed around the cooking vessel on ring 30 for the purpose of covering the space between the cooking vessel and the ring 30 when vessels of different sizes are used.

A ring 32 having two rods 33 connected by bail 39 serves for handling the cooking vessel in the cooking chamber 20. The ring 32 is adapted to receive what is spilt from the cooking vessel, so that the heating block is not polluted. The ring 32 is provided with suitable nubs 34 by means of which the cooking vessel may be kept at a certain distance from the hot surface of the heating block by lifting the ring with the cooking vessel and turning it partly. The nubs then slide along the sloping parts of teeth 36 arranged below said ring. The regulating of the heat transmission to the cooking vessel may thus be effected by means of the ring 32.

The cover 25 and its cooking plate 26 may be used separately. By means of the insulating ring 30, there may also be provided a frying chamber by using two insulating covers with their cooking plates or one insulating cover and a heating block.

As shown on Fig. 1 the tank is preferably formed of two parts, the upper part being the plate 38 containing the several cooking arrangements.

The tank 1 may be provided with inlet pipe 37, which may be connected to the main, but which may also be utilized for letting out steam to a suitable heat chamber (for heating plates). The water supply may be made to operate automatically by using a bent tube 40 connected to a water conduit.

We claim:

1. A cooking range comprising a water tank, a cover thereon, an electrically heated body supported by the cover and projecting into the tank and operating simultaneously to support a cooking utensil and to heat the water in the tank.

2. A cooking range comprising a water tank, a cover thereon, an electrically heated body supported by the cover and projecting into the tank and operating simultaneously to support a cooking utensil and to heat the water in the tank, and a hood mounted on the cover above said body and forming a cooking chamber above the cover.

3. A cooking range comprising a water tank, a cover thereon, an electrically heated body supported by the cover and projecting into the tank and operating simultaneously to support a cooking utensil and to heat the water in the tank, and a cooking chamber above said body comprising a plurality of separate superposed annular bodies and a cover resting thereon.

4. A cooking range comprising a tank, a cover thereon, a vessel suspended from the cover, and a plurality of electrically heated bodies mounted in the vessel and relatively displaceable to form a cooking chamber between them.

5. A cooking range comprising a tank, a cover thereon, a vessel suspended from the cover, and a plurality of electrically heated bodies mounted in the vessel and relatively displaceable to form a cooking chamber between them, said bodies having sufficient frictional engagement with the vessel to maintain them in position.

6. A cooking range comprising a water tank, a cover thereon, an electrically heated body supported by the cover and projecting into the tank and operating to heat the water therein, a warming receptacle suspended from the cover and heated by the water in the tank, and a floating plate adapted to close the receptacle.

7. A cooking range comprising a water tank, a cover thereon, an electrically heated body supported by the cover and projecting into the tank and operating to heat the water therein, a warming receptacle suspended from the cover and heated by the water in the tank, a cooking chamber mounted adjacent the receptacle below the tank cover, and a hinged cover adapted to alternately cover the receptacle and said cooking chamber.

In testimony that we claim the foregoing as our invention, we have signed our names in presence of two subscribing witnesses.

OSKAR SÆLID.
KRISTIAN PETTERSEN.

Witnesses:
M. E. GUSSORNESON,
C. FABRICIÚS HANSEN.